(12) United States Patent
Kamioka

(10) Patent No.: US 12,054,986 B2
(45) Date of Patent: Aug. 6, 2024

(54) SHADE GUIDE STRUCTURE

(71) Applicant: YACHIYO INDUSTRY CO., LTD., Saitama (JP)

(72) Inventor: Hirotaka Kamioka, Tochigi (JP)

(73) Assignee: YACHIYO INDUSTRY CO., LTD., Saitama (JP)

( * ) Notice: Subject to any disclaimer, the term of this patent is extended or adjusted under 35 U.S.C. 154(b) by 0 days.

(21) Appl. No.: 17/915,655

(22) PCT Filed: Mar. 3, 2021

(86) PCT No.: PCT/JP2021/008080
§ 371 (c)(1),
(2) Date: Sep. 29, 2022

(87) PCT Pub. No.: WO2021/199862
PCT Pub. Date: Oct. 7, 2021

(65) Prior Publication Data
US 2023/0113002 A1  Apr. 13, 2023

(30) Foreign Application Priority Data
Apr. 2, 2020 (JP) .................................. 2020-066691

(51) Int. Cl.
*E06B 9/58* (2006.01)
*E06B 9/42* (2006.01)

(52) U.S. Cl.
CPC ............... *E06B 9/581* (2013.01); *E06B 9/42* (2013.01)

(58) Field of Classification Search
CPC .... E06B 9/581; E06B 9/58; E06B 9/42; B60J 7/0015; B60J 7/0007; B60J 1/2052; B60J 5/14; B60J 1/2063; B60J 5/08
See application file for complete search history.

(56) References Cited

U.S. PATENT DOCUMENTS 6,443,520 B1  9/2002  Schmaelzle et al.
7,114,767 B2 * 10/2006  Grimm ...................... B60J 7/00
                                                        296/141

(Continued)

FOREIGN PATENT DOCUMENTS

CN       204161047 U    2/2015
CN       109996693 A    7/2019
(Continued)

OTHER PUBLICATIONS

PCT Search Report, Apr. 6, 2021, 2 pages.
(Continued)

*Primary Examiner* — Johnnie A. Shablack
*Assistant Examiner* — Jeremy C Ramsey
(74) *Attorney, Agent, or Firm* — Dority & Manning, P.A.

(57) ABSTRACT

To provide a shade guide structure which can be used for an application in which the guide rails are curved, in which the sliding resistance is low, and which can reduce abrasion, a shade guide structure includes: a shade sheet wound around a winding shaft so that the shade sheet can be wound up and drawn out; guide belts provided along either side edge of the shade sheet and each joined to the shade sheet via a fixation part provided substantially at a center in a width direction; and left and right guide rails which guide the guide belts in a longitudinal direction when the shade sheet is wound up or drawn out, wherein each guide rail includes: a guide wall having a lock surface which is inclined relative to the shade sheet in a transverse cross section and locks the guide belts; a slot which is formed in the guide wall and through which the shade sheet passes; and a guide part which contacts the shade sheet such that the shade sheet extends from the fixation part substantially at a right angle to the guide belt.

7 Claims, 4 Drawing Sheets

(56) References Cited

U.S. PATENT DOCUMENTS

| | | | | |
|---|---|---|---|---|
| 2008/0179021 | A1* | 7/2008 | Biewer | B60J 7/0007 |
| | | | | 160/266 |
| 2009/0145559 | A1 | 6/2009 | Glasl et al. | |
| 2009/0178771 | A1* | 7/2009 | Lin | B60J 7/0015 |
| | | | | 160/370.22 |
| 2010/0326607 | A1* | 12/2010 | Kitani | B60J 1/2052 |
| | | | | 160/268.1 |
| 2013/0038092 | A1* | 2/2013 | Rockelmann | B60J 7/0015 |
| | | | | 296/216.04 |

FOREIGN PATENT DOCUMENTS

| | | | |
|---|---|---|---|
| JP | 2001-080362 A | 3/2001 | |
| JP | 2011-006011 A | 1/2011 | |
| JP | 4936139 B2 | 5/2012 | |
| JP | 2013-506592 A | 2/2013 | |
| JP | 5458695 B2 | 4/2014 | |
| JP | 2016-022817 A | 2/2016 | |
| WO | WO-2010022769 A1 * | 3/2010 | B60J 7/0015 |

OTHER PUBLICATIONS

PCT International Search Report and Written Opinion (w/ English translation) for corresponding PCT Application No. PCT/JP2021/008080, mailed on Apr. 6, 2021, 12 pages.

PCT International Preliminary Report on Patentability (w/ English translation) for corresponding PCT Application No. PCT/JP2021/008080, mailed on Jul. 13, 2021, 6 pages.

Chinese Office Action (w/ English translation) for corresponding Chinese Application No. 202180026159.9, dated Apr. 5, 2023, 10 pages.

\* cited by examiner

SHADE GUIDE STRUCTURE

CROSS REFERENCE TO RELATED APPLICATIONS

This application is the U.S. National Stage entry of International Application No. PCT/JP2021/008080 filed under the Patent Cooperation Treaty on Mar. 3, 2021, which claims priority to Japanese Patent Application No. 2020-066691 filed on Apr. 2, 2020, both of which are incorporated herein by reference.

TECHNICAL FIELD

The present disclosure relates to a shade guide structure for guiding a shade sheet.

BACKGROUND ART

As a roof blind (shade), there is a roll blind (roll shade) which includes a blind sheet consisting of a flexible material wound around a winding shaft, and in which the blind sheet is held in a stretched state when the blind sheet is in an extended state in which the blind sheet is drawn out from the winding shaft. In the blind of this type, a bar (handle) extending in the width direction is attached to an end edge of the blind sheet in the drawing direction, and the both end portions of the bar in the longitudinal direction are guided by guide rails. Both side edges of the blind sheet are provided with guide elements which are guided by the guide rails to prevent sagging of the blind sheet. The guide elements are wound up on the winding shaft together with the blind sheet. Various guide structures for guiding the blind sheet via such guide elements have been proposed.

FIG. 12, etc. of Patent Document 1 disclose a configuration in which the side edges of the sun roll blind are provided with guide elements extending upward and downward, and these guide elements are guided in vertically-elongated grooves formed in the guide rails.

FIG. 3 of Patent Document 2 discloses a configuration in which a guide element consisting of a flat strip is fixed to each side edge part of the blind, the guide element has a cross-sectional shape curved to be convex upward, and the blind is connected to an approximate apex of the guide element. Also, FIG. 5 of the same document discloses a configuration in which each guide element has a flat rectangular cross section and is disposed in the guide groove in an inclined attitude, with the blind being connected to an upper part of the guide element and a lower part of the guide element being supported by a leg part.

FIG. 14 of Patent Document 3 discloses a configuration in which guide belts are disposed in guide passages each having a laterally elongated cross-sectional shape and provided with an upward opened exit gap (slot). The distance from a part of the guide belt where the blind sheet is stitched to the inner edge of the guide belt is greater than the distance from the inner side surface of the slot to the inner side surface of the guide passage. Thereby, wear of the blind sheet is prevented.

Patent Document 4 discloses a configuration in which the flexible belt (guide belt) mounted on each side edge of the shade sheet has an arc-shaped cross section that is curved upward or downward and is accommodated in a belt guide portion having a curved shape laterally elongated along a surface of the shade sheet. It is also described that the belt guide portion is provided with a pair of lock portions for locking side portions of the flexible belt, respectively, whereby even when a tensile stress is applied from the shade sheet, the stress is prevented from unevenly applied to the both lock portions.

PRIOR ART DOCUMENT(S)

Patent Document(s)

[Patent Document 1] JP2001-80362A
[Patent Document 2] U.S. Pat. No. 7,114,767B2
[Patent Document 3] JP4936139B2
[Patent Document 4] JP5458695B2

SUMMARY OF THE INVENTION

Task to be Accomplished by the Invention

However, each guide element has a predetermined stiffness so as to be locked by the guide rail. Therefore, if the guide element extends perpendicularly to the surface of the shade sheet as in the configuration disclosed in Patent Document 1, an ability of the guide element to conform to the guide rail shape is lowered. Therefore, it cannot be used in an application in which the guide rail is curved in the up-down direction, as in a roof of an automobile and the like.

If each guide element is disposed to be in parallel to or to be inclined relative to the surface of the shade sheet as in the configuration disclosed in Patent Document 2, the shape-conforming ability of the guide element is improved. On the other hand, the guide elements receive a reaction force for applying a tensile force to the shade sheet, and the end surfaces of the inner sides (shade sheet sides) of the left and right guide elements contact the guide rails with a high pressure. Therefore, the sliding resistance when the shade sheet is drawn out or wound up is large. Also, the sliding parts of the guide elements and the guide rails are likely to suffer abrasion. If the sliding parts suffer abrasion, it may become difficult to smoothly slide the shade sheet and the tensile force may decrease so that the shade sheet may sag.

In the configuration disclosed in Patent Document 3 also, the inner end surfaces of the guide elements contact the inner side surfaces of the guide rails (the inner surfaces of the guide passages) with a high pressure as in Patent Document 2. Further, in the configuration disclosed in Patent Document 3, if the sliding parts suffer abrasion, the pressing force of the shade sheet against the edge of the inner surface of each slot becomes high so that the shade sheet may wear out.

In the configuration disclosed in Patent Document 4, part of the reaction force applied to each guide element is distributed to the pair of lock portions. However, most of the reaction force concentrates between the inner end surface of the guide element and the inner side surface of the guide rail, and the pressure at this part is high and abrasion is likely to occur in this part, as in Patent Document 2.

In view of such background, an object of the present invention is to provide a shade guide structure which can be used in an application in which the guide rails are curved, in which the sliding resistance is low, and which can reduce abrasion.

Means to Accomplish the Task

To achieve such an object, one embodiment of the present invention provides a shade guide structure, comprising: a shade sheet (4) wound around a winding shaft (5) so that the shade sheet can be wound up and drawn out; guide belts (11) provided along either side edge of the shade sheet and each joined to the shade sheet via a fixation part (12) provided substantially at a center in a width direction; and left and right guide rails (3) which guide the guide belts in a longitudinal direction when the shade sheet is wound up or drawn out, wherein each guide rail comprises: a guide wall (25) having a lock surface (24) which is inclined relative to the shade sheet in a transverse cross section and locks the guide belt; a slot (26) which is formed in the guide wall and through which the shade sheet passes; and a guide part (27) which contacts the shade sheet such that the shade sheet extends from the fixation part substantially at a right angle to the guide belt.

According to this configuration, since each guide belt is held in an inclined attitude by the lock surface of the guide wall, the guide belt has an excellent ability to conform to the shape of the guide rail compared to a case where the guide belt is held perpendicular to the shade sheet. Therefore, it can be used in an application in which the guide rail is curved in the up-down direction, such as in the roof and the like. Also, since the guide belt receives, at the fixation part, a pulling force from the shade sheet in a perpendicular direction with respect to the guide belt so that the surface on the side of the fixation part is caused to contact the lock surface of the guide wall, the surface pressure at the contact part is low. Therefore, the sliding resistance when the shade sheet is wound up or drawn out is small and abrasion of the sliding parts is reduced.

Preferably, the lock surface of the guide wall has a width (W24) greater than a width (W11) of the guide belt in the transverse cross section, and neither of side surfaces of the guide belt (14) is in contact with the guide rail.

According to this configuration, the guide belt contacts the lock surface with the entirety of the surface other than the part opposing the slot. Therefore, the surface pressure at the contact part can be lowered and the abrasion of the sliding parts can be reduced. Also, since neither of the side surfaces of the guide belt contacts the guide rail, increase in the sliding friction between the guide belt and the guide rail is prevented.

Preferably, the left and right guide rails are disposed with an interval therebetween such that the left and right guide rails apply a tensile force in a lateral direction to the shade sheet via the guide belts, and the lock surface of each guide wall is curved in accordance with a shape of the guide belt which flexes due to the tensile force.

According to this configuration, the surface pressure distribution in the contact part between the guide belt and the lock surface is made uniform. Therefore, uneven abrasion of the guide belt and the guide wall is prevented.

Preferably, the guide part includes a contact surface (28) which, in the transverse cross section, forms an arc that contacts a side part (4S) of the shade sheet which passes through the slot and a main part (4M) of the shade sheet which is stretched between the left and right guide parts.

According to this configuration, it is possible to prevent wear of the shade sheet due to sliding with the guide part.

Preferably, the guide part is formed integrally with the guide wall and the contact surface is continuous with an end surface of the guide wall defining the slot directly or via a linear extension part (29).

According to this configuration, the guide rail can be constituted of a single member, and this facilitates manufacture and assembly.

Effect of the Invention

According to the present invention, it is possible to provide a shade guide structure which can be used in an application in which the guide rails are curved, which has low sliding resistance, and which can reduce abrasion.

DETAILED DESCRIPTION OF THE INVENTION

In the following, an embodiment of the present invention will be described in detail with reference to the drawings.

Figure 1:
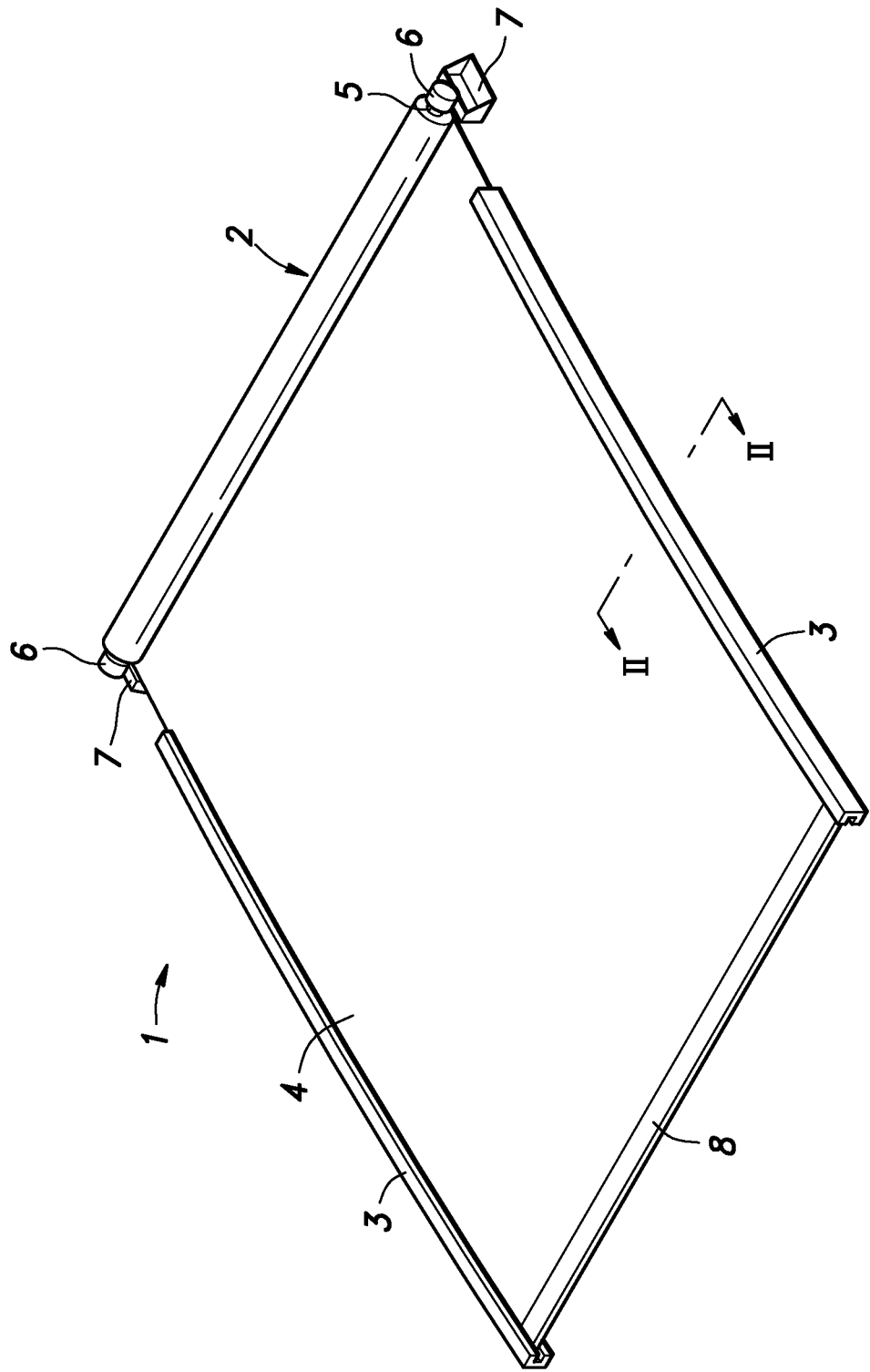
FIG. 1 is a perspective view of a shade device according to an embodiment.

FIG. 1 is a perspective view of a shade device 1 in which a shade guide structure according to the present invention is used. As shown in FIG. 1, the shade device 1 includes a roll shade 2 and two guide rails 3 disposed on the left and right of the roll shade 2 in the width direction.

The roll shade 2 includes a shade sheet 4 and a winding shaft 5 for winding up the shade sheet 4. The shade sheet 4 is a sheet made of a material having flexibility and capable of expanding and contracting, and can take a wound-up state in which the shade sheet 4 is wound up on the winding shaft 5 and an extended state in which the shade sheet 4 is drawn out from the winding shaft 5. In the present embodiment, the shade sheet 4 is drawn out substantially horizontally to adjust passage and blockage of light entering through a window disposed above (not shown in the drawings). Preferably, an upper surface of the shade sheet 4 is coated with a light-blocking material. The winding shaft 5 is always urged by a retractor 6 in a winding direction of the shade sheet 4. The retractor 6 may have a known configuration provided with a spiral spring and is fixed to a roof not shown in the drawings by support members 7.

The guide rails 3 guide the shade sheet 4 when the shade sheet 4 is wound up or drawn out and extend in the winding/drawing direction of the shade sheet 4 (hereinafter referred to as a longitudinal direction). The left and right guide rails 3 are each an extrusion molded product made of aluminum alloy and are bilaterally symmetrical in shape. The left and right guide rails 3 are curved to be convex upward in the longitudinal direction, are arranged in parallel to each other with an interval therebetween to be capable of applying a tensile force in the lateral direction to the shade sheet 4, and are fixed to the roof similarly to the retractor 6. Thereby, the shade sheet 4 is less likely to sag in the lateral direction. The proximal end of each guide rail 3 on the retractor 6 side is disposed at a position spaced from the shade sheet 4 wound up on the winding shaft 5.

A cross bar 8 extending laterally is attached to the tip of the shade sheet 4 in the longitudinal direction. Left and right end portions of the cross bar 8 are supported by the guide rails 3 to be slidable in the longitudinal direction. The left and right end portions of the cross bar 8 are joined to push-pull cables which are not shown in the drawings, and the shade sheet 4 is drawn out from the winding shaft 5 or is wound up on the winding shaft 5 when the left and right push-pull cables are pushed or pulled in the longitudinal direction in synchronization. When the shade sheet 4 is wound up or drawn out, left and right side parts 4S (see FIG. 2) of the shade sheet 4 guided by the guide rails 3 slide relative to the guide rails 3.

Figure 2:
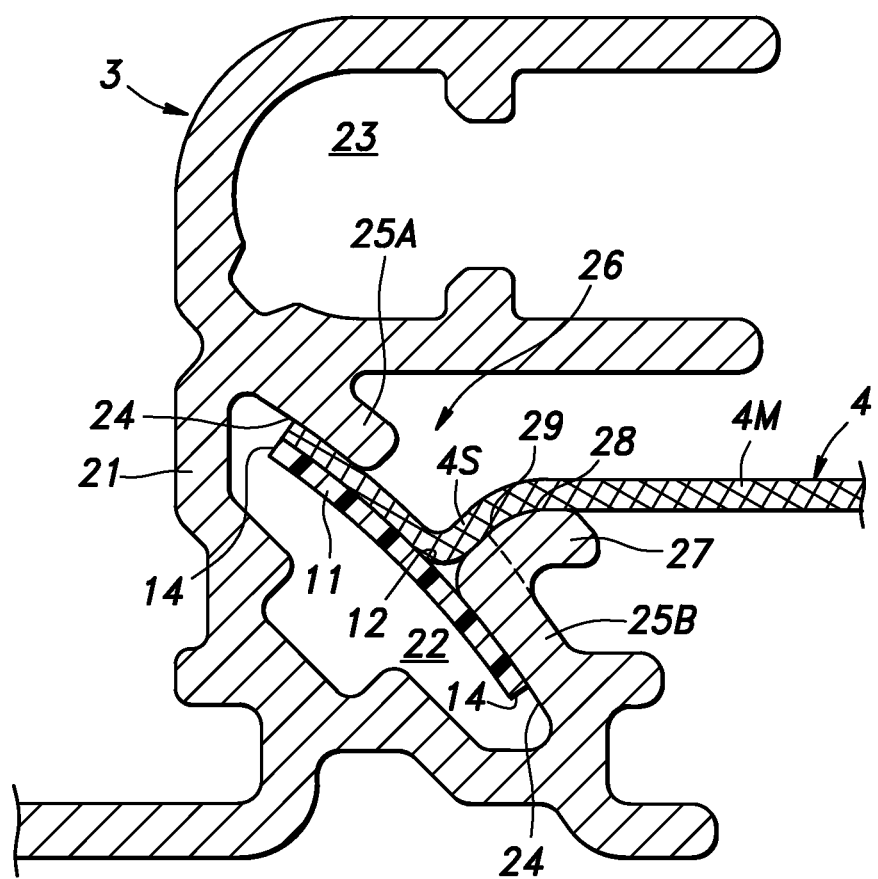
FIG. 2 is a sectional view taken along line II-II in FIG. 1.

Next, with reference to FIG. 2, a guide structure for the shade sheet 4 will be described. FIG. 2 is a transverse cross-sectional view of the left guide rail 3 taken along line II-II in FIG. 1. The guide structures for the shade sheet 4 in the left and right guide rails 3 are the same except for that they are bilaterally symmetrical. In the following, the rightward direction of the left guide rail 3 will be referred to as inward direction and the leftward direction of the same will be referred to as an outward direction.

A guide belt 11 is provided on the side edge of the shade sheet 4 such that the guide belt 11 extends in the longitudinal direction along the side edge. The guide belt 11 is made of a material having flexibility with a bending stiffness greater than that of the shade sheet 4, and when no external force is applied, is in a flat plate-shape having a rectangular cross-sectional shape. The guide belt 11 is only required to be made of a material having a low friction coefficient against the guide rail 3, and may be made of resin or metal. The guide belt 11 of the present embodiment is made of fluororesin.

The guide belt 11 is joined to the shade sheet 4 via a fixation part 12 provided substantially at the center in the width direction. Here, the fixation part 12 is a point where the shade sheet 4 is fixed, and the shade sheet 4 extends from the fixation part 12 with flexibility. In the present embodiment, the shade sheet 4 is joined to the guide belt 11 by being sutured to an approximate widthwise center of the guide belt 11 by a thread 13 in the vicinity of the side edge (see FIG. 3). An outer one of the side surfaces 14 of the guide belt 11 aligns with the side edge of the shade sheet 4, and an outer half of the guide belt 11 is in contact with the lower surface of the shade sheet 4.

In the extended state shown in FIG. 2, the guide belt 11 is held at an angle substantially perpendicular to a side part 4S of the shade sheet 4. In the wound-up state in which the shade sheet 4 is wound up on the winding shaft 5, the guide belt 11 is in parallel to the shade sheet 4 under the shade sheet 4 and is wound up together with the shade sheet 4. The spacing from the proximal ends of the guide rail 3 to the wound-up shade sheet 4 (see FIG. 1) is an angle-changing section of the guide belt 11, and in this part, the guide belt 11 is twisted in the longitudinal direction.

A part of the shade sheet 4 from the suture position (fixation part 12) to the side edge is a part where the joining force provided by the suture is maintained, and a substantive end edge of the shade sheet 4 is a part fixed to the fixation part 12. The part of the shade sheet 4 from the part fixed to the fixation part 12 to the side edge may or may not be adhered to the guide belt 11. In another embodiment, this part is bonded to the guide belt 11 with an adhesive so that the guide belt 11 is joined to the shade sheet 4. So long as a predetermined joining force is achieved, the side edge of the shade sheet 4 may be fixed to the fixation part 12 of the guide belt 11.

The guide rail 3 is provided with a rail base 21 in an upper and lower two-stage structure and has a belt guide groove 22 for receiving the guide belt 11 in the lower stage and a cable guide groove 23 for receiving the push-pull cable in the upper stage. The cable guide groove 23 opens inward and a slider (not shown in the drawings) that is joined to the push-pull cable extends inward through the opening of the cable guide groove 23 to be coupled with the cross bar 8.

The lower stage of the rail base 21 is integrally formed with a guide wall 25 (25A, 25B) having a lock surface 24 which is inclined outward toward the top and locks the guide belt 11. The belt guide groove 22 has an opening in an intermediate portion of the guide wall 25 in the width direction. The shade sheet 4 passes this opening of the belt guide groove 22 to extend to inside of the guide rail 3. Namely, this opening formed in the guide wall 25 is a slot 26 through which the shade sheet 4 passes.

The guide wall 25 is divided by the slot 26 into an upper guide wall 25A which is positioned on an outer side and a lower guide wall 25B which is positioned on an inner side. The guide wall 25 cannot lock the guide belt 11 at a part where the slot 26 is formed. Therefore, it is preferred that the width of the slot 26 is as small as possible so long as it is greater than the thickness of the shade sheet 4. The width of the slot 26 is determined by the shape of the mold used in the manufacture of the guide rail 3 and, in the present embodiment, is about several times the thickness of the shade sheet 4 and about one third of the width W11 of the guide belt 11 (see FIG. 3).

The upper end of the lower guide wall 25B is integrally formed with a guide part 27 for guiding the shade sheet 4 which extends inward from the fixation part 12 to pass through the slot 26. The guide part 27 has a contact surface 28 that extends upward and inward from the upper end of the lower guide wall 25B and contacts the lower surface of the shade sheet 4. The contact surface 28 forms an arc that contacts the side part 4S of the shade sheet 4 which passes through the slot 26 and a main part 4M of the shade sheet 4 which is stretched between the left and right guide parts 27, and is continuous with an end surface of the lower guide wall 25B defining the slot 26 via a linear extension part 29.

A tensile force in the lateral direction is applied to the shade sheet 4 from the left and right guide rails 3 via the guide belts 11. Therefore, a pulling force acts on the fixation part 12 of each guide belt 11 from the shade sheet 4 (see the arrow shown in FIG. 3). Due to the presence of the guide part 27, the shade sheet 4 extends from the fixation part 12 substantially at a right angle to the guide belt 11.

The lock surface 24 of the upper guide wall 25A locks the guide belt 11 via the shade sheet 4. As described above, the shade sheet 4 does not have to exist on the left part of the guide belt 11, and in this case, the lock surface 24 contacts the surface of the guide belt 11 and directly locks the guide belt 11. The lock surface 24 of the lower guide wall 25B contacts the surface of the guide belt 11 on the side of the fixation part 12 and directly locks the guide belt 11.

The guide wall 25 defines a belt guide groove 22 having an inner cavity greater than the width W11 of the guide belt 11, and the lock surface 24 of the guide wall 25 has a width W24 (see FIG. 3) greater than the width W11 of the guide belt 11. Further, the lock surface 24 is curved to be convex in the extension direction (inward) of the shade sheet 4, and extends out further from the both side edges of the guide belt 11. Therefore, a space is formed on each side of the guide belt 11, and neither of the side surfaces 14 of the guide belt 11 is in contact with the guide rail 3.

Since the pulling force from the shade sheet 4 acts on the fixation part 12 of the guide belt 11, the guide belt 11 flexes and is curved along the lock surface 24 of the guide wall 25. Specifically, the guide belt 11 is curved in a direction such that the fixation part 12 is convex inward and upward in the transverse cross section of FIG. 2, and is in contact with the lock surface 24 with the entirety of the surface other than the part corresponding to the slot 26. The curvature of the lock surface 24 of the guide wall 25 is set such that the surface pressure on the contact part becomes uniform in accordance with the shape of the guide belt 11 which flexes due to the tensile force.

Figure 3:
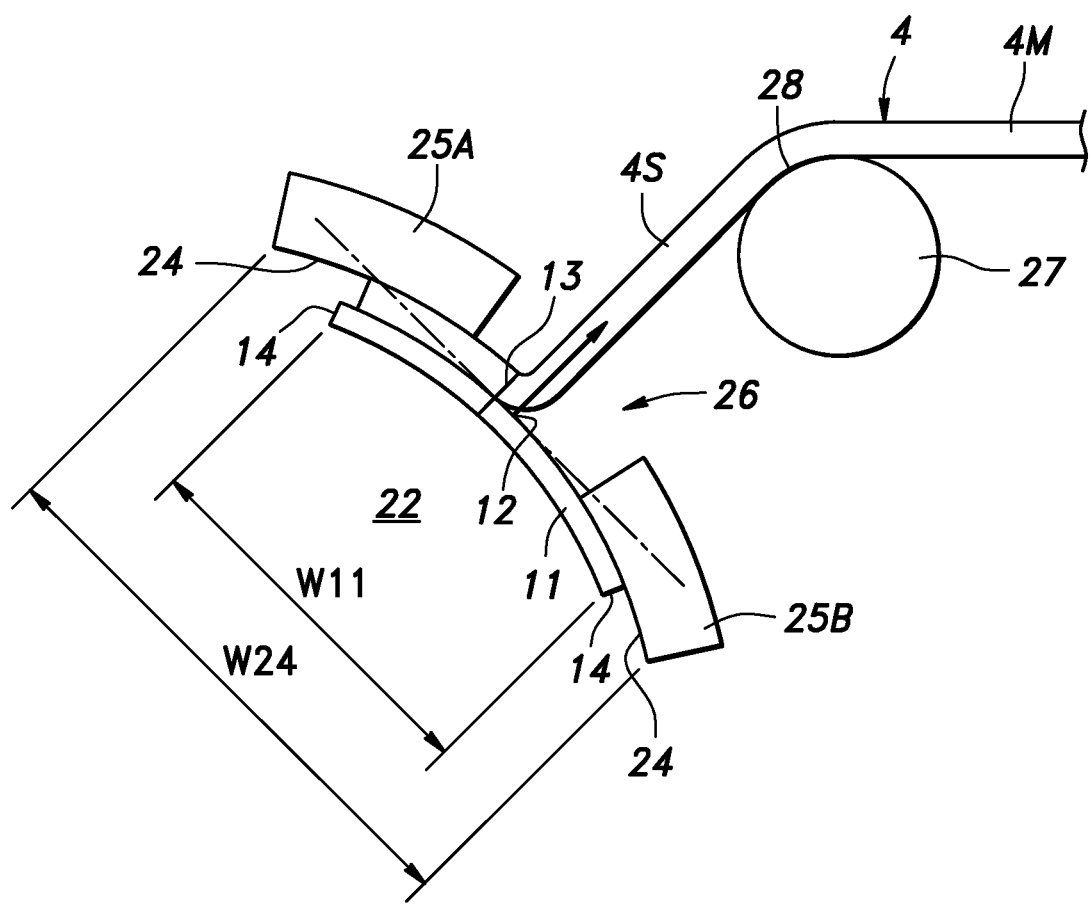
FIG. 3 is a sectional view corresponding to FIG. 2 and schematically showing a shade guide structure.

FIG. 3 is a sectional view corresponding to FIG. 2 and schematically showing the shade guide structure thus configured. In the following, with reference to FIGS. 2 and 3, the operation and effect of the shade guide structure according to the embodiment will be described.

The guide wall 25 has a lock surface 24 that is inclined relative to the shade sheet 4 in the transverse cross section and locks the guide belt 11, whereby the guide belt 11 is held in an inclined attitude by the lock surface 24 of the guide wall 25. Therefore, the guide belt 11 has an excellent ability to conform to the shape of the guide rail 3 compared to a case where the guide belt 11 is held perpendicular to the shade sheet 4. As a result, it becomes possible to use the shade guide structure in an application in which the guide rail is curved in the up-down direction, such as in the roof and the like.

The guide wall 25 is formed with a slot 26 through which the shade sheet 4 passes and the guide part 27 contacts the shade sheet 4, whereby the shade sheet 4 extends from the fixation part 12 substantially at a right angle to the guide belt 11. Accordingly, the guide belt 11 receives, at the fixation part 12, a pulling force from the shade sheet 4 in a perpendicular direction with respect to the guide belt 11 so that the surface on the side of the fixation part 12 contacts the lock surface 24 of the guide wall 25, and therefore, the surface pressure at the contact part is low. Therefore, the sliding resistance when the shade sheet 4 is wound up or drawn out is small and the abrasion of the sliding parts is reduced.

Note that the guide part 27 functions to change the extension direction of the shade sheet 4 in the cross section, and the side part 4S of the shade sheet 4 is inclined relative to the main part 4M. However, since the guide belt 11 is inclined relative to the main part 4M of the shade sheet 4, the change angle of the extension direction of the shade sheet 4 is small and the pressing force applied to the shade sheet 4 by the guide part 27 is small. Therefore, the sliding resistance between the shade sheet 4 and the guide part 27 is small and the risk of abrasion of the shade sheet 4 is low.

Figure 4:
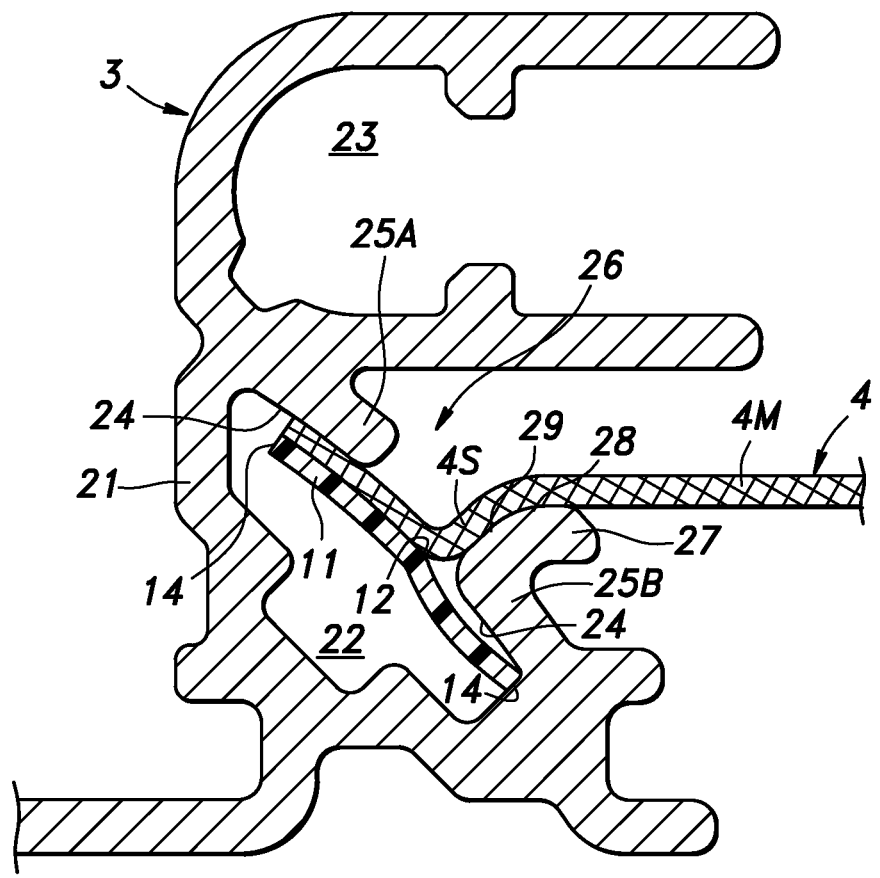
FIG. 4 is a sectional view of a shade guide structure of a comparative example.

The lock surface 24 of the guide wall 25 has a width W24 greater than the width W11 of the guide belt 11 in the transverse cross section, and the both side surfaces 14 of the guide belt 11 do not contact the guide rail 3. Therefore, the guide belt 11 contacts the lock surface 24 with the entirety of the surface other than the part opposing the slot 26. Namely, as shown in FIG. 4, if the side surface 14 of the guide belt 11 contacts the guide rail 3, the guide belt 11 does not make surface contact with the lock surface 24. Accordingly, the pressure on the contact part becomes high and the sliding resistance increases. In contrast, in the present embodiment, since the guide belt 11 contacts the lock surface 24 with the entirety of the surface other than the part opposing the slot 26, the surface pressure at the contact part is lowered and abrasion of the sliding parts is reduced. Also, since neither of the side surfaces 14 of the guide belt 11 contacts the guide rail 3, increase in the sliding friction between the guide belt 11 and the guide rail 3 is prevented.

As shown in FIGS. 1 and 2, the left and right guide rails 3 are disposed with an interval therebetween such that the left and right guide rails 3 apply a tensile force in the lateral direction to the shade sheet 4 via the guide belts 11, and this makes the shade sheet 4 less likely to sag in the lateral direction. Also, the lock surface 24 of the guide wall 25 is curved in accordance with the shape of the guide belt 11 which flexes due to the tensile force. Thereby, the surface pressure distribution in the contact part between the guide belt 11 and the lock surface 24 is made uniform. Therefore, uneven abrasion of the guide belt 11 and the guide wall 25 is prevented.

As shown in FIGS. 2 and 3, the guide part 27 includes a contact surface 28 which, in the transverse cross section, forms an arc that contacts the side part 4S of the shade sheet 4 which passes through the slot 26 and the main part 4M of the shade sheet 4 which is stretched between the left and right guide parts 27. Therefore, wear of the shade sheet 4 due to sliding with the guide part 27 is suppressed.

As shown in FIG. 2, the guide part 27 is formed integrally with the guide wall 25 and the contact surface 28 is continuous with the end surface of the guide walls 25 defining the slot 26 via the extension part 29. Therefore, the guide rail 3 can be constituted of a single member, and this facilitates manufacture and assembly of the shade guide structure. Note that though the extension part 29 contacts the side part 4S of the shade sheet 4 in the present embodiment, the extension part 29 may not contact the shade sheet 4 in another embodiment as shown in FIG. 3.

Concrete embodiments of the present invention have been described in the foregoing, but the present invention is not limited to the above embodiments and may be modified or altered in various ways. For example, the concrete structure, arrangement, number, material, and procedure of each member or part described in the above embodiment may be appropriately changed without departing from the spirit of the present invention. Also, not all of the components shown in the foregoing embodiments are necessarily indispensable and they may be selectively adopted as appropriate.

LIST OF REFERENCE NUMERALS 1 shade device
2 roll shade
3 guide rail
4 shade sheet
4M main part
4S side part
5 winding shaft
11 guide belts
12 fixation part
14 side surface
22 belt guide groove
24 lock surface
25 guide wall
25A upper guide wall
25B lower guide wall
26 slot
27 guide part
28 contact surface
29 extension part
W11 width of guide belts 11
W24 width of lock surface

The invention claimed is:

1. A shade guide structure, comprising:
a shade sheet wound around a winding shaft so that the shade sheet can be wound up and drawn out;
a pair of guide belts each being provided along a respective side edge of the shade sheet and each joined to the shade sheet via a respective fixation part provided substantially at a center in a width direction and having a rectangular cross-sectional shape when no external force is applied; and
left and right guide rails which guide the guide belts in a longitudinal direction when the shade sheet is wound up or drawn out,
wherein the left and right guide rails are disposed with an interval therebetween such that the left and right guide rails apply a tensile force in a lateral direction to the shade sheet via the guide belts, wherein each guide rail comprises:

a guide wall having a lock surface including a curvature and which is inclined relative to the shade sheet in a transverse cross section and locks a corresponding guide belt of the pair of guide belts;

a slot which is formed in the guide wall and through which the shade sheet passes; and a guide part which contacts the shade sheet such that the shade sheet extends from a corresponding one of the fixation parts substantially at a right angle to the corresponding guide belt, wherein the shade sheet includes a main part stretched between the guide parts of the left and right guide rails, and left and right side parts each inclined relative to the main part and extending from the corresponding fixation part substantially at a right angle to the corresponding guide belt to pass through a corresponding one of the slots, and wherein the lock surface of each guide wall is curved to be convex in an extension direction of the shade sheet and the corresponding guide belt flexes in conformity to a shape of the lock surface due to a pulling force which is a reaction force and acts on the fixation part from the shade sheet substantially at the right angle to the guide belt.

2. The shade guide structure according to claim 1, wherein the lock surface of each guide wall has a width greater than a width of the corresponding guide belt in the transverse cross section, and the guide belt is provided with a pair of side surfaces which are spaced from the guide rail.

3. The shade guide structure according to claim 2, wherein the curvature of the lock surface of each guide wall is configured such that the corresponding guide belt applies pressure evenly to the lock surface.

4. The shade guide structure according to claim 1, wherein each guide part includes a contact surface which, in the transverse cross section, forms an arc that contacts the corresponding side part of the shade sheet and the main part of the shade sheet.

5. The shade guide structure according to claim 4, wherein each guide part is formed integrally with the corresponding guide wall and the contact surface is continuous with an end surface of the guide wall defining the slot directly or via a linear extension part.

6. The shade guide structure according to claim 1, wherein the guide wall comprises an upper guide wall positioned on an outer side of the guide rail and a lower guide wall positioned on an inner side of the guide rail.

7. The shade guide structure according to claim 6, wherein an upper end of the lower guide wall is integrally formed with the guide part configured to contact and guide a portion of the shade sheet.

\* \* \* \* \*